(12) United States Patent
Bates et al.

(10) Patent No.: US 6,425,127 B1
(45) Date of Patent: Jul. 23, 2002

(54) METHOD AND SYSTEM FOR CONTROLLING VISUAL ACCESS BY A USER TO BROADCAST VIDEO SEGMENTS

(75) Inventors: Cary Lee Bates, Rochester, MN (US); Robert James Crenshaw, Apex, NC (US); Paul Reuben Day; John Santosuosso, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/483,795

(22) Filed: Jan. 13, 2000

(51) Int. Cl.[7] .......................... H04N 7/025; H04N 7/10; H04N 9/00; H04N 7/16
(52) U.S. Cl. ............................................ 725/32; 725/22
(58) Field of Search ............................... 725/32, 36, 34, 725/35, 22, 25, 28, 42, 9, 14; H04N 7/025, 7/10, 9/00, 7/16; G06F 3/00, 13/00

(56) References Cited

U.S. PATENT DOCUMENTS 5,241,428 A * 8/1993 Goldwasser et al. ........ 386/109
5,959,623 A * 9/1999 Van Hoff et al. ............ 345/719
5,973,723 A * 10/1999 Deluca ......................... 725/34
6,009,410 A * 12/1999 LeMole et al. ............... 705/14
6,029,045 A * 2/2000 Picco et al. ................... 725/34

* cited by examiner

Primary Examiner—Vivek Srivastava
(74) Attorney, Agent, or Firm—Andrew Dillon

(57) ABSTRACT

A method and system for controlling visual access by a user to selected broadcast commercial advertisements. A video stream which includes multiple commercial advertisements is broadcast to multiple receivers, each coupled to a video display at a user's location. Unique identifications of each commercial advertisement and an initiation/termination delimiter signal are also embedded within the video stream. Selected commercial advertisements are then stored within memory within each receiver in response to an indication that a particular video stream containing those commercial advertisements is not currently displayed at a user's location. Thereafter, these stored commercial advertisements are substituted for an alternate commercial advertisement within the video stream at a subsequent time in response to an indication that the particular video stream is once again displayed at a user's location, ensuring that the selected commercial advertisements are viewed by a user.

12 Claims, 3 Drawing Sheets

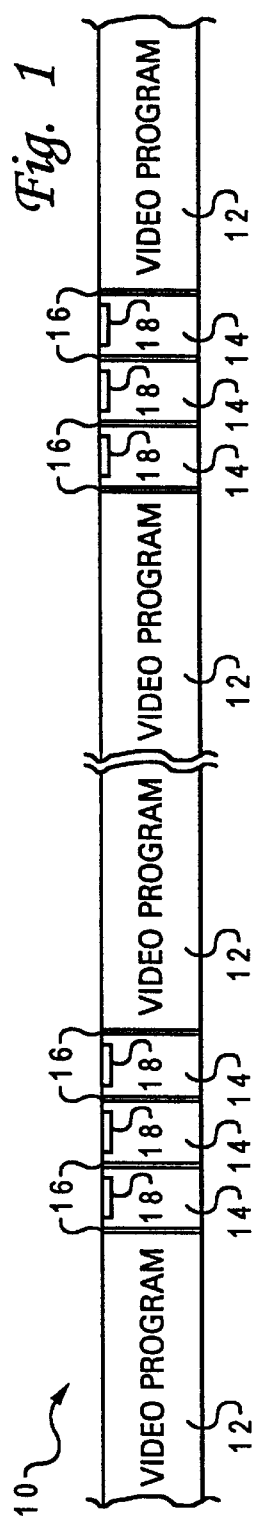
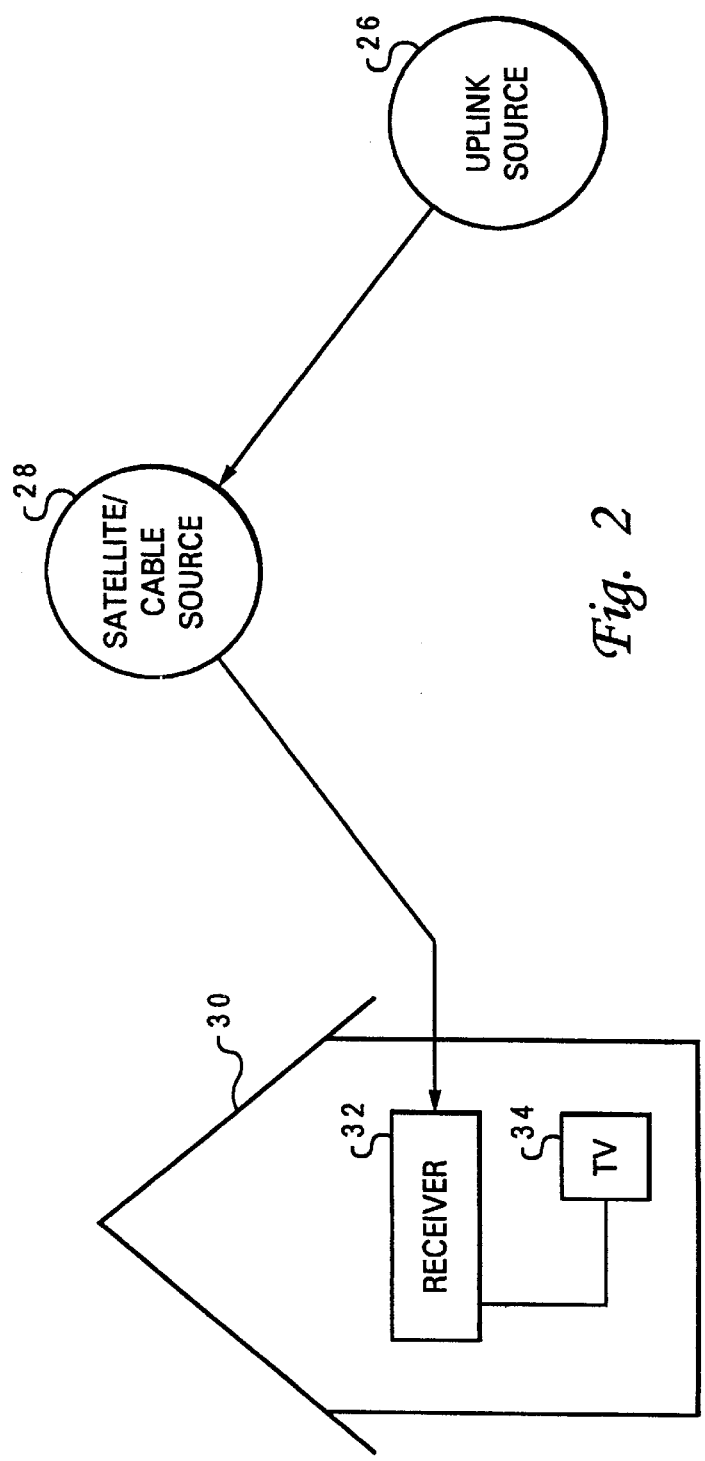

METHOD AND SYSTEM FOR CONTROLLING VISUAL ACCESS BY A USER TO BROADCAST VIDEO SEGMENTS

BACKGROUND OF THE INVENTION

1. Technical Field

The present invention relates in general to methods and systems for processing and displaying video data and in particular to an improved method and system for controlling the selective presentation of commercial advertisements within a video data stream. Still more particularly, the present invention relates to an improved method and system for ensuring that particular commercial advertisements within a video data stream are viewed by a user.

2. Description of the Related Art

Broadcast television, whether transmitted from a satellite or a cable television provider, provides perhaps the most important advertising media in the world today. The price charged by broadcast networks for limited commercial slots within highly rated broadcasts, such as the Super Bowl, reflect the importance that advertisers place on this medium. However, the advent of remote control devices and video tape recorders has resulted in a situation in which advertising slots may not be seen by a user who "surfs" the other channels during advertisement periods.

In recognition of this problem, advertisers often purchase multiple advertisement slots during a single television program or during a series of television programs in order to ensure that consumers will have a high likelihood of having viewed a particular commercial advertisement. Thus, an advertiser may purchase four transmissions of a particular commercial advertisement in order to ensure that a large number of people will view that commercial advertisement. It should therefore be apparent that a mechanism which could ensure that the same number of people view the commercial advertisement utilizing fewer transmissions of the commercial advertisement would be highly desirable.

Additionally, a mechanism whereby transmission of a fewer number of advertisements could ensure that the commercial advertisement is viewed by a larger number of people could substantially increase the economic value of those commercial advertisements to the network while simultaneously increasing the number of users who view a particular commercial advertisement.

Additionally, the digital manipulation of television signals is becoming increasingly common. Satellite transmissions utilizing digital technology as well as so-called "web-tv" are two known techniques whereby digital content is coupled from a provider to a set-top box or receiver at the user's location. Additionally, the set-top box or receiver is often utilized to enforce billable content, such as whether or not a particular viewer is a subscriber for a selected premium service.

Consequently, it would be desirable to combine the digital technology present within the various set-top boxes and receivers to enhance the efficiency of advertisements within a video data stream.

SUMMARY OF THE INVENTION

It is therefore one object of the present invention to provide an improved method and system for processing and displaying video data.

It is another object of the present invention to provide an improved method and system for controlling the selective presentation of commercial advertisements within a video data stream.

It is still another object of the present invention to provide an improved method and system for ensuring that a particular commercial advertisement within a video data stream is viewed by a user.

The foregoing objects are achieved as is now described. A method and system are disclosed for controlling visual access by a user to selected broadcast commercial advertisements. A video stream which includes multiple commercial advertisements is broadcast to multiple receivers, each coupled to a video display at a user's location. Unique identifications of each commercial advertisement and an initiation/termination delimiter signal are also embedded within the video stream. Selected commercial advertisements are then stored within memory within each receiver in response to an indication that a particular video stream containing those commercial advertisements is not currently displayed at a user's location. Thereafter, these stored commercial advertisements are substituted for alternate commercial advertisements within the video stream at a subsequent time in response to an indication that the particular video stream is once again displayed at a user's location, ensuring that the selected commercial advertisements are viewed by a user.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a schematic representation of a video data stream which includes a video program and embedded commercial advertisements;

FIG. 2 is a pictorial representation of a system for controlling the selective presentation of commercial advertisements in accordance with the method and system of the present invention;

DETAILED DESCRIPTION OF THE PREFERRED EMBODIMENT

Figure 3:
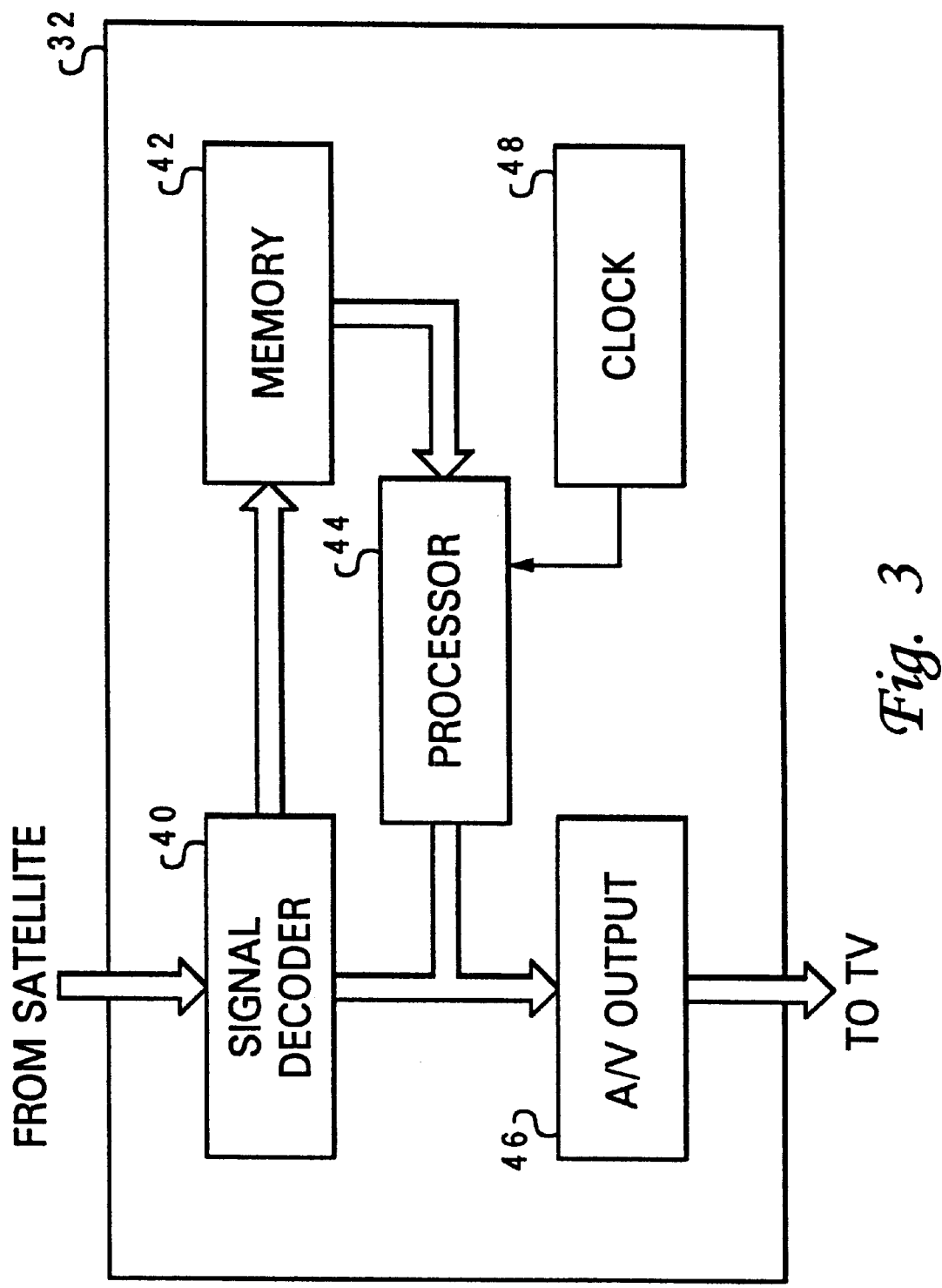
FIG. 3 is a more detailed block diagram of a receiver for controlling the selective presentation of commercial advertisements in accordance with the method and system of the present invention.

With reference now to the figures and in particular with reference to FIG. 1, there is depicted a schematic representation of a video data stream 10 which includes a video program 12 and a plurality of embedded commercial advertisements 14. Of course, those skilled in the art will appreciate that in the typical television receiver system, multiple video streams will be present, one for each channel of video information; however, for purposes of simplicity of illustration, only a single video stream 10 is depicted within FIG. 1.

As illustrated within FIG. 1, each commercial advertisement 14 is preceded and followed by a start/stop delimiter 16. Those having skill in this art will appreciate that a start/stop delimiter comprises a unique digital signature which indicates that a commercial advertisement is about to begin or terminate and such signals are commonly utilized to synchronize the transmission of a commercial advertisement with the termination of a particular segment of video program 12.

Additionally, in accordance with an important feature of the present invention, each commercial advertisement 14 includes a unique advertisement ID 18 which is embedded digitally within the signal. In this manner, each commercial advertisement can be identified uniquely as to its source and content so that a determination can be made, in accordance with the method and system of the present invention, whether or not a particular commercial advertisement was broadcast while the user was viewing video stream 10.

Referring now to FIG. 2, there is depicted a pictorial representation of a system for controlling the selective presentation of commercial advertisements in accordance with the method and system of the present invention. As illustrated, an uplink source 26 is provided which serves as a source for both video program 12 and commercial advertisements 14, including the start/stop delimiter signals associated with each commercial advertisement and the unique advertisement ID depicted within FIG. 1.

The video stream which includes both the video program and commercial advertisements is then coupled to a satellite or cable source 28. Of course, as noted above, typically multiple uplink sources 26 are utilized so that each channel of video data can be provided from a different uplink source.

Next, a transmission of the multiple video streams is broadcast from satellite or cable source 28 to a user residence 30 where that signal is coupled, via an appropriate antenna or connection to receiver 32.

Receiver 32 may comprise a desk-top digital cable box, a satellite receiver or any other mechanism suitable for receiving a plurality of video streams comprising digital data as described above. Finally, an audio/video output from a selected video stream is coupled from receiver 32 to television 34 for viewing by a user.

With reference now to FIG. 3, there is depicted a more detailed block diagram of receiver 32 which may be utilized to control the selective presentation of commercial advertisements in accordance with the method and system of the present invention. As depicted, the multiple video streams transmitted by satellite or cable source 28 are coupled to signal decoder 40. Signal decoder 40, in accordance with a preferred embodiment of the present invention, comprises a decoder capable of decoding the digital representation of the various video programs and commercial advertisements for conversion into audio/video signals capable of being utilized by television 34 (see FIG. 2) for viewing by a user. Additionally, in accordance with an important feature of the present invention, signal decoder 40 is also capable of identifying each start/stop delimiter signal and each unique advertisement ID so that the presence or absence of a commercial advertisement and the identity of that commercial advertisement may be readily and efficiently obtained.

Memory 42 is also provided and coupled to signal decoder 40 so that, as will be explained in greater detail herein, particular commercial advertisements may be temporarily stored within memory 42 for subsequent utilization. Stored commercial advertisement within memory 42 may then be coupled, under the control of and via processor 44 to audio/video output 46 for presentation to a user via television 34 (see FIG. 2). Additionally, clock 48 is provided and utilized to provide control signals for processor 44 as well as synchronization signals which may be necessary to substitute one or more recorded commercial advertisements into the video stream in a manner which will be explained in greater detail herein.

Figure 4:
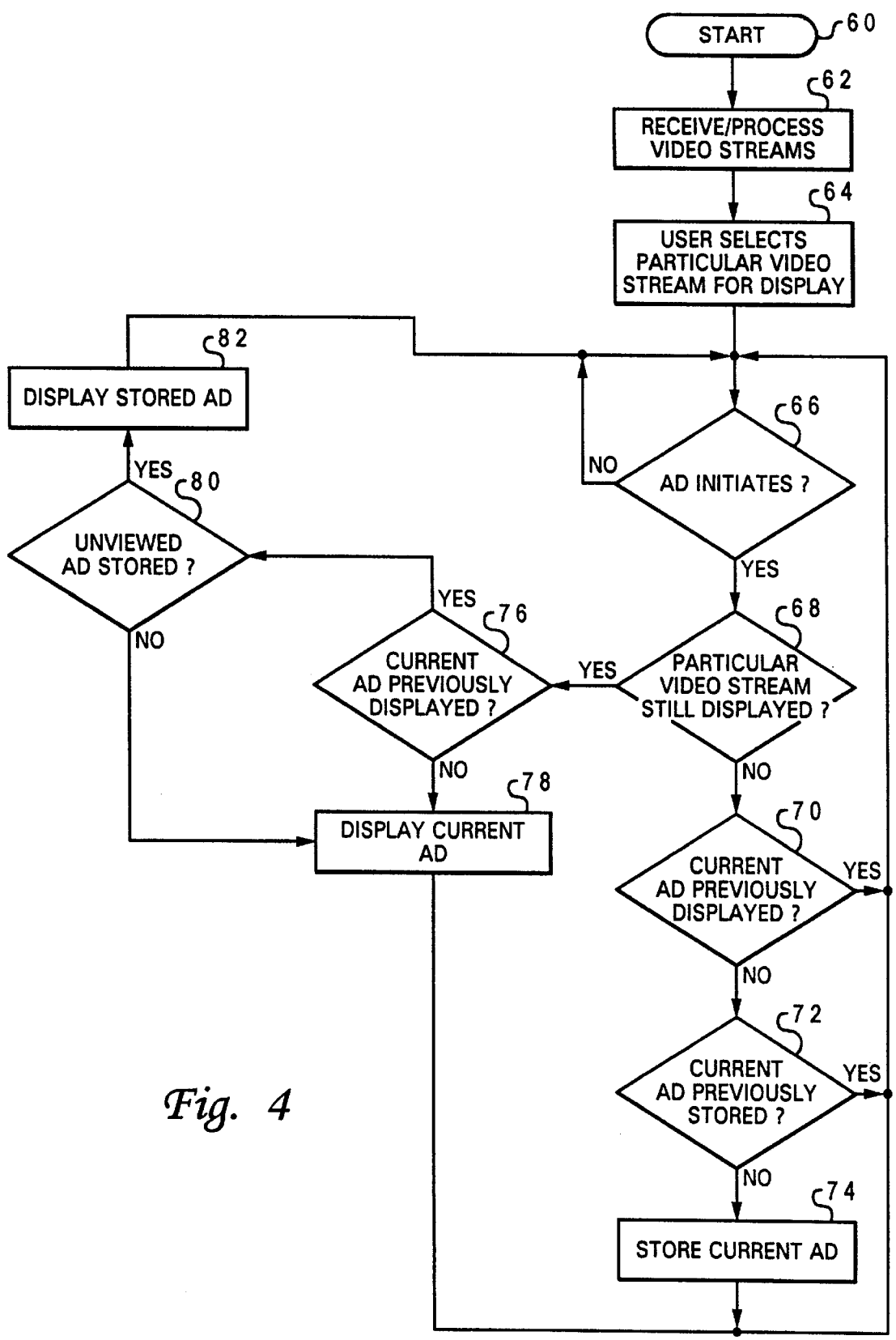
FIG. 4 is a high level logic flowchart illustrating the process of the present invention.

Finally, referring to FIG. 4, there is depicted a high level logic flowchart which illustrates the process for selective presentation of commercial advertisement in accordance with the method and system of the present invention.

As depicted, this process begins at block 60 and thereafter passes to block 62. Block 62 illustrates the receiving and processing of multiple video streams in a manner well known to those having ordinary skill in this art. Next, the process passes to block 64.

Block 64 depicts the selection by a user of a particular video stream for display within television 34 (see FIG. 2). Those having skill in this art will appreciate that multiple video streams are typically transmitted via cable or satellite and the user may select from some number of those video streams in accordance with particular subscriber relationships.

Next, the process passes to block 66. Block 66 illustrates a determination that a commercial advertisement has initiated. This is, of course, determined by the detection of a start/stop delimiter signal associated with a particular commercial advertisement. In the event a commercial advertisement has not initiated, the process returns to block 66 in an iterative fashion to await the initiation of a commercial advertisement.

Next, still referring to block 66, in the event a commercial advertisement initiates, the process passes to block 68. Block 68 depicts a determination of whether or not the particular video stream selected by the user is still displayed and if not, the process passes to block 70. Block 70 illustrates a determination of whether or not the current commercial advertisement has been previously displayed and if so, the process returns to block 66, in an iterative fashion, to await the initiation of a subsequent commercial advertisement.

Still referring to block 70, in the event the current commercial advertisement has not been previously displayed, the process passes to block 72. Block 72 depicts a determination of whether or not the current commercial advertisement has been previously stored within memory 42 (see FIG. 3) and if so, the process again returns to block 66, in an iterative fashion, to await the initiation of a subsequent commercial advertisement.

Still referring to block 72, in the event the current commercial advertisement has not been previously stored, the process passes to block 74 which depicts the storing of the current commercial advertisement and, once again, the process returns to block 66 in an iterative fashion to await the initiation of a subsequent commercial advertisement.

Referring again to block 68, in the event a commercial advertisement has initiated and the particular video stream selected by the user for display is still displayed, the process passes to block 76. Block 76 depicts a determination of whether or not the current commercial advertisement has been previously displayed and if not, the process passes to block 78.

Block 78 depicts the display of the current commercial advertisement and thereafter, the process returns to block 66, in an iterative fashion, to await the initiation of a subsequent commercial advertisement.

Referring again to block 76, in the event the current commercial advertisement has been previously displayed, the process passes to block 80. Block 80 illustrates a determination of whether or not an unviewed commercial advertisement is stored and if so, the process passes to block 82. Block 82 depicts the displaying of the stored commercial advertisement, in substitution for the current commercial advertisement and thereafter, the process passes to block 66 to once again await the initiation of a subsequent commercial advertisement.

Referring again to block 80, in the event no unviewed commercial advertisements are stored within the system, the process passes to block 78 which illustrates the display of the current commercial advertisement and the process then returns to block 66, in an iterative fashion, as described above.

Upon reference to the foregoing, those skilled in the art will appreciate that the method and system of the present invention provides a technique whereby particular commercial advertisements may be designated for storage in the event the user is no longer viewing a particular video data stream and then substituted back into the video data stream in place of an alternate commercial advertisement which has been previously viewed by the user, in order to ensure that a particular commercial advertisement is viewed by a user to the greatest extent possible. Commercial advertisements which may be stored and moved within the video data stream in this manner are referred to, as described herein, as "bumpable" advertisements in that these advertisements may be buffered and then subsequently allocated to available slots within the video data stream. Additionally, selected commercial advertisements may be created which are not "bumpable" and which may not be stored and subsequently reintroduced into the video data stream.

As an example, presume that a video program is transmitted from uplink source 26 (see FIG. 2) which includes four commercial breaks with three commercial advertisements within each break. Thus, there are twelve possible slots for commercial advertisements within this particular video program.

For purposed of this illustration, let us assume that four advertisers are interested in purchasing commercial advertisements during this video program and that these four advertisers are Pizza (P); Circus (C); Jeweler (J); and, Beer (B). Further, for purposes of this illustration, assume that Pizza purchases one slot for a commercial advertisement in each of the four available commercial breaks and wishes the user to see this commercial advertisement each time it is aired. Consequently, the Pizza advertiser purchases a "non-bumpable" commercial advertisement. Thus, there are eight slots left within this video program. Circus purchases two slots of a "bumpable" commercial advertisement and Jeweler also purchases two slots of a "bumpable" commercial advertisement. The remaining four slots are sold as "bumpable" commercial advertisements to Beer.

One plausible layout for commercial advertisements within the video program as originally broadcast would be:

BCP . . . JPB . . . PCE . . . PBJ

Next if we assume that the Circus advertiser wished to purchase four advertising slots in order to reach some number of people at least once, the question becomes "what is the number of people who will see the Circus commercial advertisement at least once if Circus purchases two 'bumpable' slots, and is this number greater than or equal to the number of people who would see the commercial advertisement at least once, if four slots were purchased."

Analyzing this problem, it is determined that there are actually six slots in which the Circus commercial advertisement could potentially be seen since there are twelve total slots, and the Pizza commercial advertisements are "non-bumpable" and thus, there are eight remaining slots. Beer and Jeweler cannot be bumped the first time they are broadcast, since they could not have been seen before they were shown and thus, six slots are available for Circus to bump another commercial advertisement if needed. Thus, in accordance with the method and system of the present invention, if the Circus commercial advertisement has not been seen when any of these six slots occur, the Circus commercial advertisement could bump the commercial advertisement present within that slot and be shown at that time. Thus, the Circus commercial advertisement will never be seen more than twice, but the number of people that see the circus commercial advertisement at least once will be the same as if the Circus commercial advertisement had been broadcast six times. Thus, in terms of being seen at least once, the circus advertiser reaches more users than would have been available had four traditional advertisement slots been purchased.

Next analyzing the original layout of the commercial advertisements as originally broadcast, if the user is tuned into the entire video program, no commercial advertisements are temporarily stored and no commercial advertisements will need to be bumped, so that each commercial advertisement is then seen in the original order in which those commercial advertisements were broadcast. This user thus visually accesses the Circus commercial advertisement twice.

Next, if we assume that the user sees the first block of commercial advertisements within the original layout or commercial advertisements, but has changed channels during the second block of commercial advertisements, and then returns to the video program during the last two blocks of commercial advertisements, the following result occurs where lower case representation indicates that the commercial advertisement has not been visually displayed to the user:

BCP . . . jpb . . . PJB . . . PBJ

In this scenario, when the third commercial break occurs, the user has seen the Circus and Beer commercial advertisements once, but has not seen the Jeweler commercial advertisement. Therefore, at the next, "bumpable" slot available, the Jeweler commercial advertisement is shown. Similarly, since the viewer is displaying the video program during the fourth commercial break and since all commercial advertisements have been seen at least once, the fourth commercial break is broadcast normally, with no commercial advertisements replaced. In this manner, both the Circus and Jeweler have paid for two slots within the commercial breaks and both have been seen at least once. Provisions can be made to fairly or otherwise determine which commercial advertisements are displayed within the fourth commercial break. For example, randomness may be used to fairly even-out the number of commercial advertisements which are seen by bumping commercial advertisements that have bumped others earlier. Similarly, a higher priced "non-bumpable" commercial advertisement category could be employed which "bumps" all other commercial advertisements once those "bumpable" commercial advertisements have been viewed some predetermined number of times. Further, a very low cost "bumpable" commercial advertisement category could be employed which could be "bumped" by any other commercial advertizement once it has been viewed at least once. Similarly, a higher priced "bumpable" commercial advertisement category could be assigned having a higher priority of selection for available slots in the event multiple "bumpable" commercial advertisements have not been seen.

In this manner, utilizing the method and system of the present invention, other manipulations of the broadcast order of commercial advertisements are also possible. For example, an advertiser may wish to ensure that a series of commercial advertisements is seen in a particular order. This can be accomplished by saving one or more commercial advertisements within memory which have been missed by the user and bumping the next commercial advertisement in the sequence so that the original order is maintained. Similarly, companies may purchase related product commercial advertisements for multiple subsidiaries within a particular corporation. For example, a large fast food conglomerate may include pizza, Mexican food and chicken and may wish to dictate the number of advertisements seen by a user in an internal order of priority among the related advertisements.

Preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described within reference to FIG. 4 can be accomplished with a computer-aided device. In such a method, data stored in a memory unit of a data-processing system such as a data-processing system, can represent steps in a method for implementing a preferred embodiment of the present invention.

Upon reference to the foregoing, those skilled in the art will appreciate that the method and system of the present invention provides a technique whereby, utilizing digital signal processing, commercial advertisements may be selectively buffered and rebroadcast in an efficient manner to ensure that presentation of a particular commercial advertisement to the largest number of users has occurred.

While the invention has been particularly shown and described with reference to a preferred embodiment, it will be understood by those skilled in the art that various changes in form and detail may be made therein without departing from the spirit and scope of the invention.

What is claimed is:

1. A method for controlling visual access by a user to broadcast video segments, said method comprising the steps of:

transmitting a video stream which includes a plurality of discrete video segments;

determining if said video stream is continuously displayed at a user's location for a selected period of time;

automatically storing a selected one of said plurality of discrete video segments in response to a determination that said video stream was not displayed at a user's location during broadcast of said selected one of said plurality of discrete video segments; and selectively displaying said stored selected one of said plurality of discrete video segments in place of another one of said plurality of discrete video segments broadcast at a subsequent time in response to a subsequent determination that said video stream is once again displayed at said user's location, wherein said stored selected one of said plurality of discrete video segments is a commercial advertisement.

2. The method for controlling visual access by a user to broadcast video segments according to claim 1, wherein said step of transmitting a video stream which includes a plurality of discrete video segments comprises the step of transmitting a video stream which includes a plurality of discrete video segments and a unique identifier of each of said plurality of discrete video segments.

3. The method for controlling visual access by a user to broadcast video segments according to claim 2, wherein said step of transmitting a video stream which includes a plurality of discrete video segments comprising the step of transmitting a video segment which includes a plurality of discrete video segments and an indication of the initiation and termination of each of said plurality of discrete video segments.

4. The method for controlling visual access by a user to broadcast video segments according to claim 1, wherein said step of transmitting a video stream which includes a plurality of discrete video segments comprises the step of transmitting a plurality of video streams, each of said plurality of said video streams including a plurality of discrete video segments.

5. The method for controlling visual access by a user to broadcast video segments according to claim 4, wherein said step of determining if said video stream is continuously displayed at a user's location for a selected period of time comprises the step of determining which of said plurality of video streams is displayed at a user's location during a selected period of time.

6. The method for controlling visual access by a user to broadcast video segments according to claim 4, wherein the step of automatically storing a selected one of said plurality of discrete video segments in response to a determination that said video stream was not displayed at a user's location during broadcast of said selected one of said plurality of discrete video segments comprises the step of automatically storing a group of related discrete video segments in response to a determination that said video stream was not displayed at a user's location during broadcast of said group of said plurality of discrete video segments.

7. The method for controlling visual access by a user to broadcast video segments according to claim 6, wherein said step of selectively displaying said stored selected one of said plurality of discrete video segments in place of another one of said plurality of discrete video segments in response to a subsequent determination that said video stream is once again displayed at said user's location comprises the step of selectively displaying said group of related discrete video segments in a predetermined order in place of another group of said plurality of discrete video segments in response to a subsequent determination that said video stream is once again displayed at said user's location.

8. The method for controlling visual access by a user to broadcast video segments according to claim 6, wherein said step of displaying a stored selected one of said plurality of discrete video segments in place of another one of said plurality of discrete video segments in response to a subsequent determination that said video stream is once again displayed at said user's location comprises the step of selectively displaying a selected subset of said group of related discrete video segments in response to a subsequent determination that said video stream is once again displayed at said user's location.

9. A system for controlling visual access by a user to broadcast video segments, said system comprising:
- a transmitter for broadcasting a video stream which includes a plurality of discrete video segments;
- a receiver for coupling one or more video streams to a video display at a user's location;
- memory within said receiver for automatically storing one of said plurality of discrete video segments in response to a determination that said video stream is not displayed at said video display at said user's location during broadcast of said selected one of said plurality of discrete video segments; and
- a processor coupled to said memory for selectively coupling said stored one of said plurality of discrete video segments to said video display at said user's location in place of another one of said plurality of discrete video segments broadcast at a subsequent time in response to a subsequent determination that said video stream is once again displayed at said video display at said user's location, wherein said stored one of said plurality of discrete video segments is a commercial advertisement.

10. The system for controlling visual access by a user to broadcast video signals according to claim 9, wherein said transmitter broadcasts a video stream which includes a plurality of commercial advertisements and a unique identification of each of said plurality of commercial advertisements.

11. The system for controlling visual access by a user to broadcast video signals according to claim 10, wherein said transmitter broadcasts a video stream which includes a plurality of commercial advertisements and an identification of the initiation and termination of each of said plurality of commercial advertisements.

12. An article of manufacture for controlling visual access by a user to broadcast video segments, said method comprising the steps of:
- transmitting a video stream which includes a plurality of discrete video segments;
- determining if said video stream is continuously displayed at a user's location for a selected period of time;
- automatically storing a selected one of said plurality of discrete video segments in response to a determination that said video stream was not displayed at a user's location during broadcast of said selected one of said plurality of discrete video segments; and
- selectively displaying said stored selected one of said plurality of discrete video segments in place of another one of said plurality of discrete video segments broadcast at a subsequent time in response to a subsequent determination that said video stream is once again displayed at said user's location, wherein said stored selected one of said plurality of discrete video segments is a commercial advertisement.

* * * * *